(12) United States Patent
Lee et al.

(10) Patent No.: US 7,432,972 B2
(45) Date of Patent: Oct. 7, 2008

(54) METHOD OF CONTROLLING DIGITAL PHOTOGRAPHING APPARATUS, AND DIGITAL PHOTOGRAPHING APPARATUS UTILIZING THE METHOD

(75) Inventors: Yoo-shin Lee, Seongnam-si (KR); Kyoung-ae Kim, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 677 days.

(21) Appl. No.: 11/028,387

(22) Filed: Jan. 3, 2005

(65) Prior Publication Data

US 2006/0044460 A1 Mar. 2, 2006

(30) Foreign Application Priority Data

Aug. 26, 2004 (KR) .................. 10-2004-0067432

(51) Int. Cl.
*H04N 5/222* (2006.01)
(52) U.S. Cl. .................. 348/333.02; 348/333.04; 348/371
(58) Field of Classification Search .......... 348/370, 348/371
See application file for complete search history.

(56) References Cited

U.S. PATENT DOCUMENTS

| 4,992,810 | A  | * | 2/1991 | Schappler | 396/177 |
| 5,424,772 | A  | * | 6/1995 | Aoki et al. | 348/220.1 |
| 6,539,177 | B2 | * | 3/2003 | Parulski | 396/287 |
| 6,853,750 | B2 | * | 2/2005 | Aoki | 382/190 |

* cited by examiner

*Primary Examiner*—Ngoc-Yen Vu
*Assistant Examiner*—Nicholas G Giles
(74) *Attorney, Agent, or Firm*—Drinker Biddle & Reath LLP

(57) ABSTRACT

Provided are a method for controlling a digital photographing apparatus that informs a user when a flash is set to go off when photographing, and photographs with the flash according to user manipulation, and a digital photographing apparatus utilizing the method. In one implementation of the method, the digital photographing apparatus stores an image file in a recording medium after photographing a subject, plays the image file stored in the recording medium, and displays the image file on a display panel. Various implementations of the method include: determining the on/off state of the flash when a shutter release button is pressed to a first step when a mode that protects the subject from the flash is set; and if it is determined that the flash is "on," informing the user of the "on" state of the flash.

16 Claims, 16 Drawing Sheets

US 7,432,972 B2

METHOD OF CONTROLLING DIGITAL PHOTOGRAPHING APPARATUS, AND DIGITAL PHOTOGRAPHING APPARATUS UTILIZING THE METHOD

BACKGROUND OF THE INVENTION

This application claims the priority of Korean Patent Application No. 2004-67432, filed on Aug. 26, 2004, in the Korean Intellectual Property Office, the disclosure of which is incorporated herein in its entirety by reference.

1. Field of the Invention

The present invention relates to a digital photographing apparatus, and more particularly, to a method of controlling a digital photographing apparatus, and a digital photographing apparatus utilizing the method.

2. Description of the Related Art

In a conventional digital photographing apparatus, a selected flash mode is indicated via an icon displayed on a display panel, for example, a liquid crystal display (LCD). There are generally numerous different icons corresponding to each different flash mode. However, a user may not always recognize the icons, and thus might be unaware at times as to whether a flash is turned "on" or "off."

In addition, in an automatic flash mode, in which a flash automatically operates when there is less than a predetermined amount of light, the user might have no warning or notification as to when the flash will operate. Therefore, users likely do not know whether a flash will activate or not in most circumstances. For example, when taking a picture of an infant in an automatic flash mode, the flash may operate without warning and startle the infant or even hurt the infant's eyes.

SUMMARY OF THE INVENTION

An embodiment of the present invention provides a method for controlling a digital photographing apparatus that informs a user of the "on" state of a flash, if it is determined that the flash is "on," and photographs with the flash in response to user manipulation, and a digital photographing apparatus utilizing the method.

According to an embodiment of the present invention, there is provided a method of providing a protection mode for a digital photographing apparatus that stores an image file in a recording medium after photographing a subject, plays the image file stored in the recording medium, and displays the image file on a display panel, wherein the protection mode protects a subject from a flash and is settable by a user. The method includes: determining an on/off state of a flash when the user presses a shutter release button to a first step and informing the user of the "on" state of the flash, if it is determined that the flash is "on."

In setting the protection mode in an embodiment of the invention, the user further selects an automatic protection mode or a manual protection mode. If the user selects the automatic protection mode and presses the shutter release button to a second step, the digital photographing apparatus takes a picture with the flash. There is a predetermined time lapse between when the user is informed of the "on" state of the flash and when apparatus actually takes the picture.

In an embodiment of the invention, when the manual protection mode is selected by a user, the method further includes: receiving a consent signal from the user as to whether photographing will occur with or without the flash, following the informing of the user of the "on" state of the flash; and photographing with or without the flash in the manner as indicated by the consent signal, following the pressing by the user of the shutter release button to a second step.

When an automatic protection mode is selected by a user in an embodiment of the invention, the method further comprises selection by user manipulation of a no alert mode, an alerting display mode, an alarm mode, or a vibration mode.

When a manual protection mode is selected by a user in an embodiment of the invention, the method further comprises selection by user manipulation of a no alert mode, an alerting display mode, an alarm mode, or a vibration mode.

In various embodiments of the invention, the user can be informed of the "on" state of the flash through use of a predetermined alerting display. The alerting display, in this regard, can be an icon or text. Moreover, the user can be informed of the "on" state of the flash through use of a predetermined alarm. Moreover, the user can be informed of the "on" state of the flash through use of a predetermined vibration.

According to another embodiment of the present invention, there is provided a digital photographing apparatus utilizing one or more of the above-mentioned methods.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
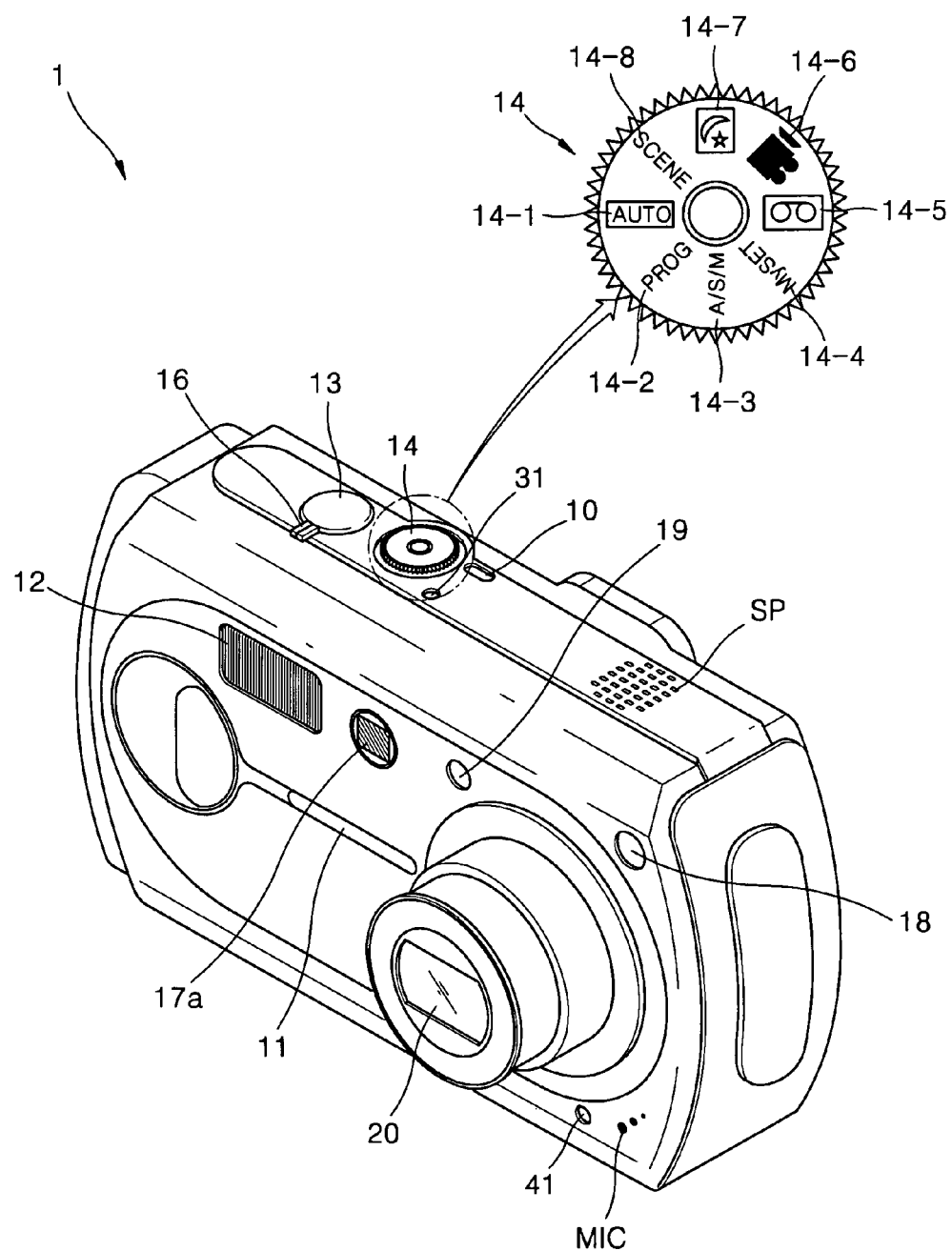
FIG. 1 is a perspective view of a digital camera illustrating the top and front thereof according to an embodiment of the present invention.

Referring to FIG. 1, a digital camera 1, which is a digital photographing apparatus, according to an embodiment of the present invention includes a microphone MIC, an operate/self-timer lamp 11, a flash 12, a view finder 17a, an automatic focus-aiding light 18, a flash light amount sensor (FS) 19, a lens unit 20, and a remote control sensor 41 on its front; and a speaker SP, a mode dial lamp 10, a shutter release button 13, a mode dial 14, a jog dial 16, and a power button 31 on its top.

Figure 2:
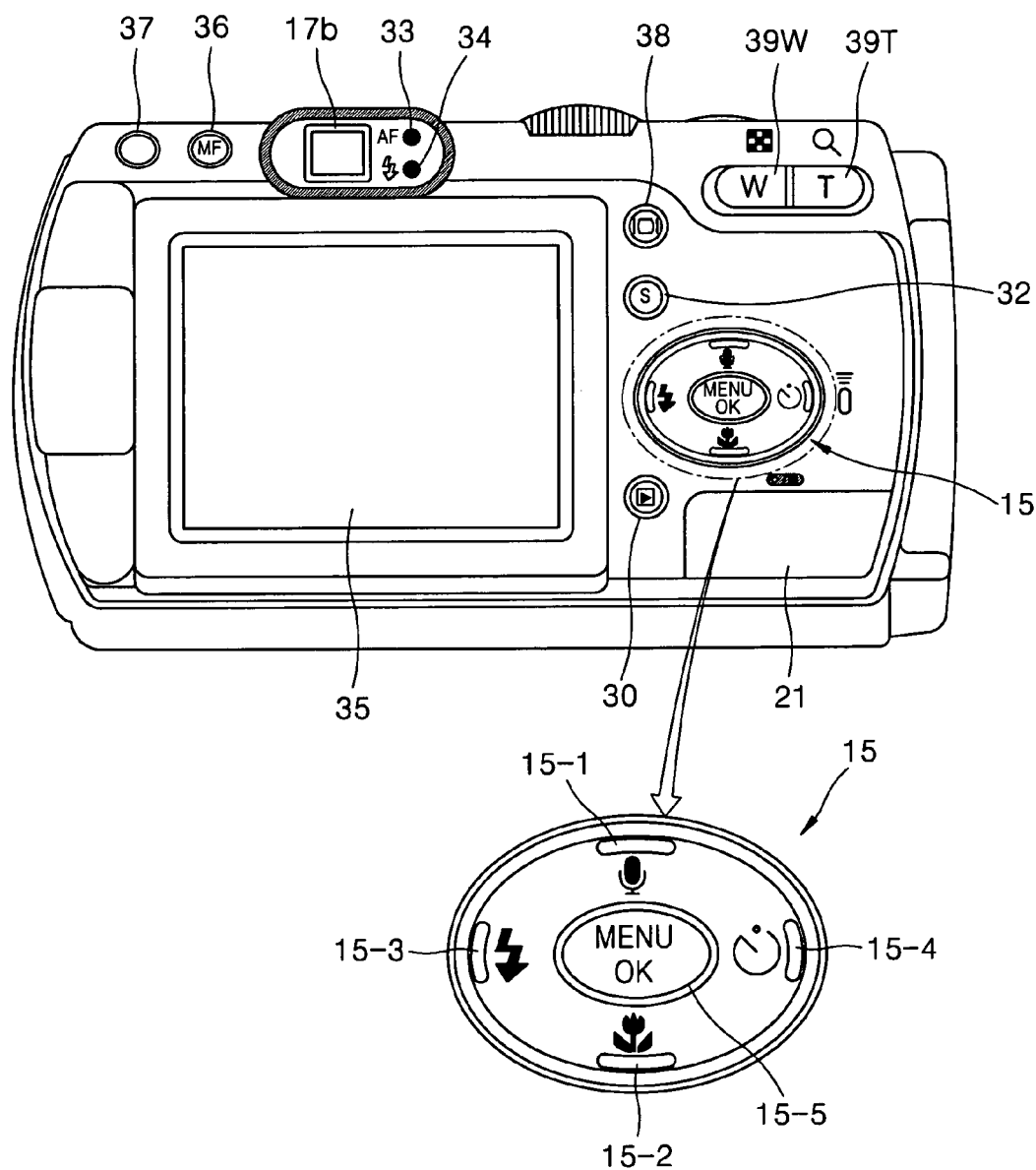
FIG. 2 is a rear view of the digital camera of FIG. 1.

The mode dial lamp 10 is lit when a screen of a color liquid display panel (LCD) 35 (see FIG. 2) is turned "off" by pressing an LDC button 38 (see FIG. 2).

The operate/self-timer lamp 11 operates to indicate a power on state, a moving picture photographing state, an audio recording state, or a remote controlling state. Also, when using a self-timer, the operate/self-timer lamp 11 operates for a predetermined amount of time from a point the shutter release button 13 is pressed after pressing the shutter release button 13 until an image is captured.

The shutter release button 13 has a two-step structure. If the shutter release button 13 is pressed only to a first step, a signal SH1 from the shutter release button 13 is turned "on," and if the shutter release button 13 is pressed to the second step, a signal SH2 from the shutter release button 13 is turned "on."

The mode dial 14 is used to select and set one among a plurality of operating modes of the digital camera 1. The plurality of operating modes may include, for example, an automatic photographing mode 14-1, a program photographing mode 14-2, an A/S/M photographing mode 14-3, a MySET photographing mode 14-4, an audio recording mode 14-5, a moving picture photographing mode 14-6, a night scene photographing mode 14-7, and a scene photographing mode 14-8.

Here, the automatic photographing mode 14-1 enables quick and easy photographing that requires a minimal amount of user manipulation.

The program photographing mode 14-2 enables the user to set various functions of the digital camera 1, except for aperture value and shutter speed.

The A/S/M photographing mode 14-3 enables the user to set various functions of the digital camera 1 including the aperture value and shutter speed. "A" denotes an aperture priority photographing mode, "S" denotes a shutter speed priority photographing mode, and "M" denotes a manual photographing mode.

The MySET photographing mode 14-4 enables frequently used camera shooting settings to be stored in the digital camera 1 and recalled later.

The audio recording mode 14-5 enables only audio data to be recorded for a predetermined duration determined by the storage space of a memory and stored in the memory. The file format of the audio data may be "wav."

The moving picture photographing mode 14-6 enables moving picture data to be recorded for a predetermined duration determined by the storage space of the memory and stored in the memory. The file format of the moving picture data may be "mov."

The night scene photographing mode 14-7 enables photographing at night or in dark surroundings.

The scene photographing mode 14-8 enables the user to set the optimum setting of the digital camera 1 according to the state of a subject or photographing conditions (e.g., portrait, landscape, close-up, sunset, dawn, sun behind subject, fireworks, beach, or snowscape).

The jog dial 16 is used to manually control a focal length and an aperture value and a shutter speed in the A/S/M photographing mode 14-3.

Figure 3:
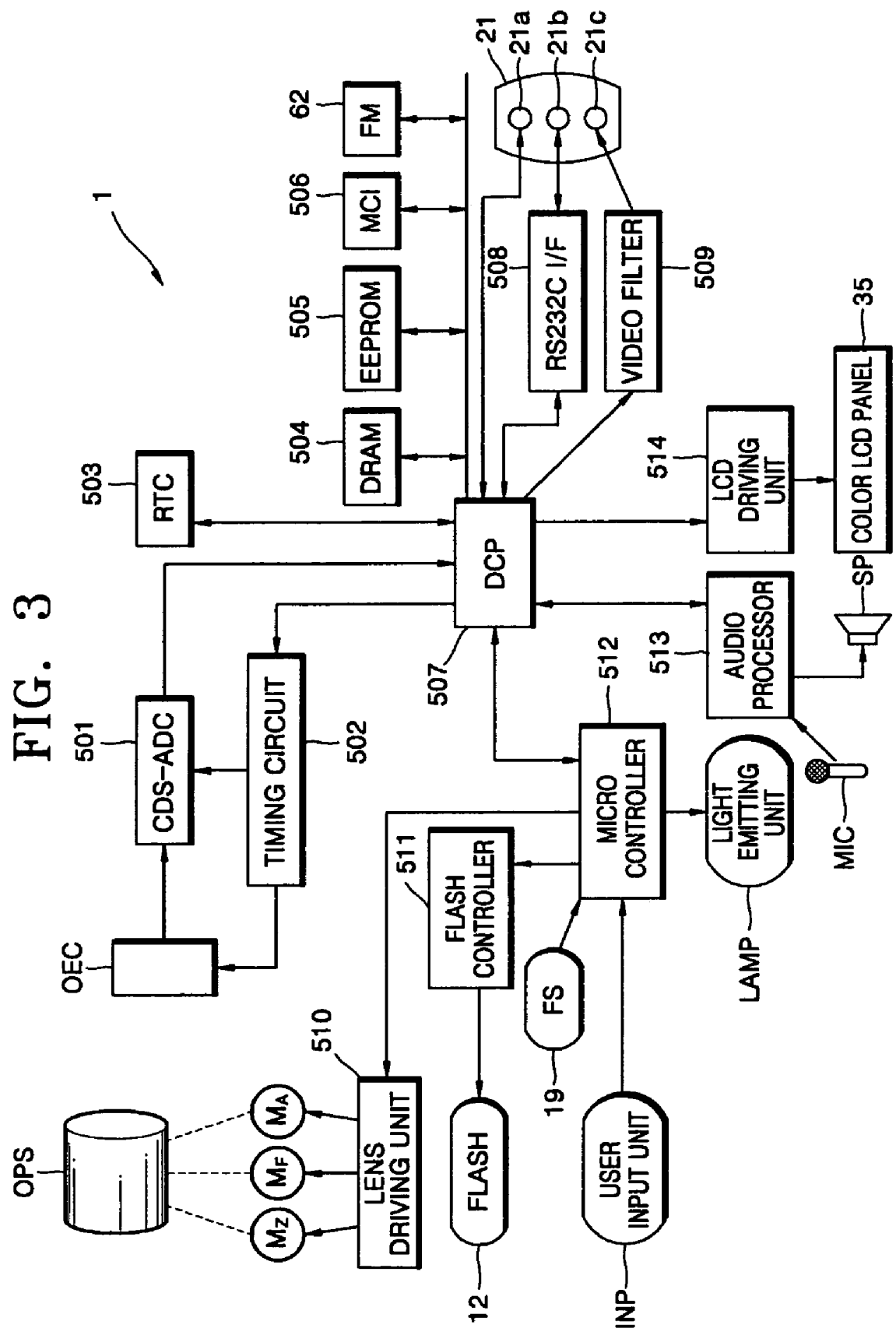
FIG. 3 is a block diagram showing the internal structure of the digital camera of FIG. 1.

The FS 19 senses the light amount of the flash 12 and inputs the sensed light amount to a digital camera processor (DCP) 507 (see FIG. 3) via a micro controller 512 (see FIG. 3).

The remote control sensor 41 receives an infrared photographing command signal from a remote control (not shown), and inputs it to the DCP 507 via the micro controller 512.

Referring to FIG. 2, function buttons 15, an external interface unit 21, a play mode button 30, an "S" button 32, an automatic focus indicator lamp 33, a flash indicator lamp 34, the color LCD panel 35, a manual focus/delete button 36, an automatic exposure lock/copy button 37, the LCD button 38, a zoom "W" button 39W, and a zoom "T" button 39T are included on the back of the digital camera 1.

The function buttons 15 are used to perform particular functions of the digital camera 1 as well as act as direction-movement keys of an activated cursor on a menu screen of the color LCD panel 35. The function buttons 15 include an audio memo/top button 15-1, a macro/down button 15-2, a flash/left button 15-3, a self-timer/remote control/right button 15-4, and a menu/OK button 15-5.

If the audio memo/top button 15-1 is pressed when the menu screen of the color LCD panel 35 is displayed, a cursor on a lower menu moves upwards, and when the menu screen 5 is not displayed, an audio memo can be recorded with a stored photograph.

If the macro/down button 15-2 is pressed when the menu screen is displayed, a cursor on a main menu may move to a lower menu or a cursor on the lower menu may move down. Also, an object at close range can be photographed if the macro/down button 15-2 is pressed when the menu screen is not displayed.

If the flash/left button 15-3 is pressed when the menu screen is displayed, a menu tab on the left may be selected, and when the menu screen is not displayed, it is used as a flash button.

Flash modes include an automatic flash mode, a fill-in mode, a red-eye reduction mode, a slow shutter mode, and a flash off mode. In the automatic flash mode, the flash 12 automatically flashes when a subject or a landscape is dark. In the fill-in mode, the flash 12 always flashes regardless of the brightness of the subject or the surroundings but flashes with a light amount that is automatically controlled according to the brightness of the surroundings. In the red-eye reduction mode, in order to prevent red-eye caused by sudden expansion of the subject's pupils in dark places, a preliminary flash operates before a shutter (not shown) opens, to adjust the subject's pupils, and then a photograph is taken together with another flash of the flash 12. In the slow shutter mode, the shutter is operated slowly together with the flash 12 in order to obtain a brighter image of the subject and the background when it is dark, for example, at twilight. In the flash off mode, the flash 12 does not operate. The flash off mode may be used in places where flash photography is not allowed, such as art galleries and museums, or when taking a refined photograph of an interior.

In a method of controlling the digital camera 1 according to an embodiment of the present invention, if the signal SH1 is turned "on" by depressing the shutter release button 13 to the first step, the DCP 507 determines whether the flash 12 is on/off. If it is determined that the flash 12 is "on," the user is notified or informed. When an automatic protection mode is selected by the user, after the user has set the protection mode which protects the subject from the flash 12, and the signal SH2 is turned "on" by the user by depressing the shutter release button 13 to the second step, flash photographing is performed after a predetermined time has passed since notifying the user of the state of the flash 12. Alternatively, when a manual protection mode is selected by the user, after the user has set the protection mode which protects the subject from the flash 12, a consent signal is received from the user as to whether photographing will occur with or without the flash, following the informing of the user of the "on" state of the flash. Then, when signal SH2 is turned "on" by the user by pressing the shutter release button 13 to the second step, photographing is performed with the flash 12 turned either "on" or "off" in the manner as indicated by the consent signal.

If the self-timer/remote control/right button 15-4 is pressed while the menu screen is displayed on the color LCD panel 35, a menu tab on the right is selected. If the self-timer/remote control/right button 15-4 is pressed while the menu screen is not displayed on the color LCD panel 35, photographing is performed after a preset time has passed. This function may be used for photographing oneself.

If the menu/OK button 15-5 is pressed while the menu screen is displayed, data values can be changed and stored using the function buttons 15. When the menu screen is not displayed, a menu screen for each camera operation is displayed on the color LCD panel 35, and if the menu/OK button 15-5 is pressed again, an original screen reappears.

A setup mode of the digital camera 1 is input using the menu/OK button 15-5. In particular, the mode that protects the subject from the flash 12 may be set using the menu/OK button 15-5. The protection mode which protects the subject from the flash 12 may be set by the user to an automatic protection mode or to a manual protection mode. In particular, for example, the automatic protection mode and the manual protection mode can each set an alerting display, an alarm, or a vibration. When the flash 12 is to be turned "on," the user is alerted in the manner specified by the user.

The external interface unit 21 comprises, for example, a universal serial bus (USB) port and an audio-visual (AV) input terminal.

An image or a moving picture stored in the memory can be played by pressing the play mode button 30 in a play mode. Alternatively, the play mode may change to a photographing mode by pressing the play mode button 30.

Exposure compensation, white balance, sensitivity (ISO), RGB, the A/S/M photographing mode, and a long time shutter mode may be selected. The exposure compensation enables automatic control of exposure to an appropriate level by using the "S" button 32. The white balance enables attainment of an image with natural colors. The ISO enables selection of sensitivity when photographing an image, and is displayed after conversion into a number. As the ISO rating increases, the sensitivity of a camera increases, as well as the photographing ability of the camera in dark places. However, the noise in an image increases, making it grainy. The RGB enables the user to control red (R), green (G), and blue (B) values of an image to be photographed. The A/S/M is a menu for setting an aperture value or shutter speed. In the "A" (aperture-priority) photographing mode, a shutter speed is automatically set after an aperture value is decided, to maintain an appropriate level of exposure according to the brightness of the subject. The aperture value may be altered by turning the jog dial 16 left/right. In the "S" (shutter-priority) photographing mode, an aperture value is automatically set after a shutter speed is set, to maintain an appropriate level of exposure according to the brightness of the subject. The shutter speed may be changed by turning the jog dial 16 left/right. In the "M" (manual) photographing mode, a shutter speed and an aperture value are both set manually by the user. In the long-time shutter mode, the user may set a shutter speed and an aperture value in the night-scene photographing mode.

When the shutter release button 13 is pressed only to the first step, the automatic focus indicator lamp 33 lights up if an image is well-focused and remains unlit if the image is not well-focused.

The flash indicator lamp 34 is unlit if the flash 12 is charging and lights up when it becomes possible to photograph using the flash 12.

The manual focus/delete button 36 is used to select a focusing method. Every time the manual focus/delete button 36 is pressed, the focusing mode changes in the order of manual focus, continuous automatic focus, and automatic focus. In the automatic focus mode, the distance from a subject to the digital camera 1 is measured when the shutter release button 13 is pressed to the first step, thereby enabling the most appropriate focal length to be calculated. If the subject is brought into focus when the shutter release button 13 is pressed to the first step, an automatic focus mark turns green. In the manual focus mode, the digital camera 1 is focused manually. This mode may be used when it is difficult to use the automatic focus (e.g., in dark places), but the image may not be blurred in this case. In the continuous automatic focus mode, the digital camera 1 automatically controls the focal length at all times, and adjusts the focus if the relative positions between the camera and the subject change, even when the shutter release button 13 is not depressed by the user to the first step. In the continuous automatic focus mode, the digital camera 1 consumes more power than in the automatic focus mode. Also, the manual focus/delete button 36 is for deleting images stored in a memory card.

In a photographing environment in which illumination is strong or the source of illumination is located behind the subject, if the automatic exposure lock/copy button 37 is pressed and the difference in an exposure value between subject and background is high, an appropriate exposure value may be manually set. Also, the automatic exposure lock/copy button 37 is for copying an image stored in the memory card to another memory card.

The currently set photographing information may be checked by pressing the LCD button 38, which displays the information on the color LCD panel 35. An image may be rotated by 180° (flipped) and displayed on the color LCD panel 35 by pressing the LCD button 38. Also, by pressing the LCD button 38, the background of a menu may be made darker to improve visibility of the menu, and only an image may be displayed without any photographing information.

By pressing the zoom "W" button 39W and the zoom "T" button 39T, an optical zoom and a digital zoom enable the user to view a photograph on an enlarged or reduced scale, a plurality of photographs together, or a desired portion of a photograph, which can be cut and stored.

Figure 4:
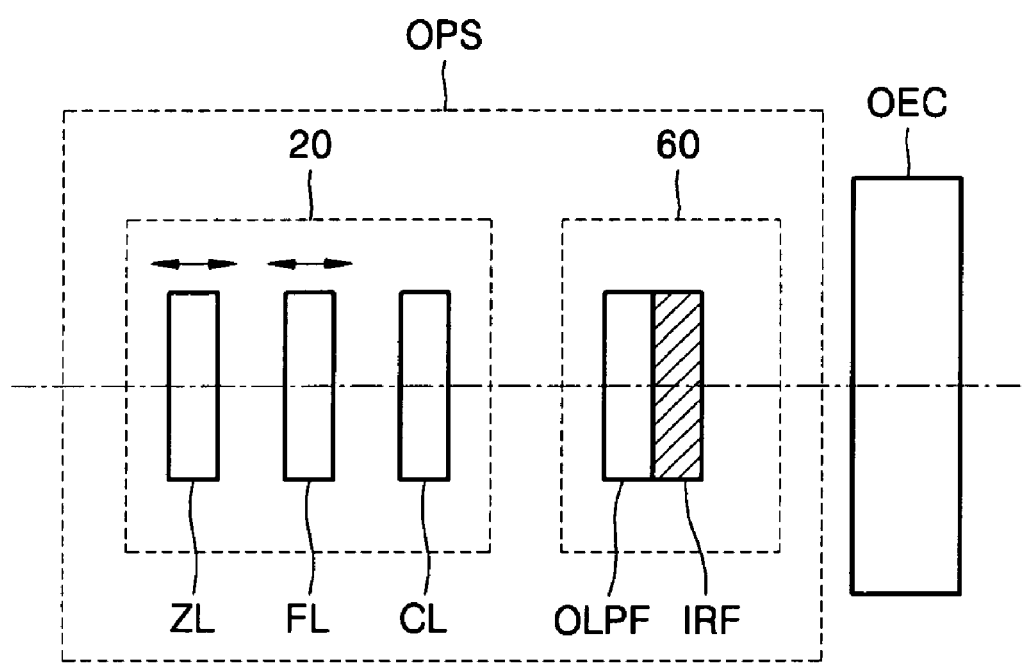
FIG. 4 is a diagram showing the structure of an optical system and a photoelectric converter of the digital camera 1 of FIG. 1.

FIG. 3 is a block diagram showing the overall structure of the digital camera 1 of FIG. 1, and FIG. 4 is a diagram showing the structure of an optical system OPS and a photoelectric converter OEC of the digital camera 1 of FIG. 1. Referring to FIGS. 1 through 4, the overall structure and operations of the digital camera 1 will be described.

The optical system OPS including the lens unit 20 and a filter 60 optically processes light reflected from a subject. The lens unit 20 of the optical system OPS includes a zoom lens ZL, a focus lens FL, and a compensation lens CL (see FIG. 4).

If a user presses the zoom "W" button 39W or the zoom "T" button 39T included in a user input unit INP, a signal corresponding to the zoom "W" button 39W or the zoom "T" button 39T is input to the micro controller 512. Accordingly, the micro controller 512 controls a lens driving unit 510 and operates a zoom motor $M_Z$, thereby operating the zoom lens ZL. More specifically, if the zoom "W" button 39W is pressed, a focal length of the zoom lens ZL is shortened, thereby increasing a view angle, and if the zoom "T" button 39T pressed, a focal length of the zoom lens ZL is lengthened, thereby decreasing a view angle. Here, since the location of the focus lens FL is controlled while the location of the zoom lens ZL is fixed, the view angle is hardly affected by the location of the focus lens FL.

In an automatic focus mode, a main controller (not shown) embedded in the DCP 507 controls the lens driving unit 510 via the micro controller 512, and thus operates a focus motor $M_F$. Accordingly, the focus lens FL moves, and in this process, the locations of the focus lens FL at which high frequency components of an image signal are strongest, for example, the number of steps of the focus motor $M_F$, are set.

The compensation lens CL of the optical system OPS acts to compensate the overall refractive index, and thus is not operated separately. $M_A$ denotes a motor for driving an aperture (not shown).

In the filter unit of the optical system OPS, an optical low-pass filter removes high-frequency optical noise. An infrared cut filter blocks incident infrared light.

The photoelectric converter OEC of a charge couple device (CCD) or complementary metal oxide semiconductor (CMOS) (not shown) converts light from the optical system OPS into analog electrical signals. Here, the DCP 507 controls a timing circuit 502 and the operation of an analog-to-digital converter (ADC) 501. The ADC 501 may be a correlation double sampler and analog-to-digital converter (CDS-ADC) device 501 which processes the analog signals from the photoelectric converter OEC and converts them into digital signals after removing high-frequency noise and altering their bandwidth.

A real-time clock (RTC) 503 provides information on time to the DCP 507. The DCP 507 processes the digital signals from the CDS-ADC device 501 and generates digital image signals that are divided into brightness and chromaticity signals.

A light emitting unit LAMP that is operated by the micro controller 512 according to control signals from the DCP 507 with the embedded main controller includes the operate/self-timer lamp 11, the automatic focus indicator lamp 33, and the flash indicator lamp 34. The user input unit INP includes the shutter release button 13, the mode dial 14, the function buttons 15, the jog dial 16, the play mode button 30, the power button 31, the "S" button 32, the manual focus/delete button 36, the automatic exposure lock/copy button 37, the zoom "W" button 39W, and the zoom "T" button 39T.

The digital image signal transmitted from the DCP 507 is temporarily stored in a dynamic random access memory (DRAM) 504. Procedures needed in the operation of the DCP 507 are stored in an electrically erasable and programmable read-only memory (EEPROM) 505. A memory card of the user is inserted into and removed from a memory card interface (MCI) 506.

The digital image signals from the DCP 507 are input into an LCD driving unit 514. As a result, an image is displayed on the color LCD panel 35.

The digital image signals from the DCP 507 can be transmitted in series via a USB connector 21a or a RS232C interface 508 and its connector 21b, or can be transmitted as video signals via a video filter 509 and a video outputting unit 21c.

An audio processor 513 outputs audio signals from a microphone MIC to the DCP 507 or a speaker SP, and outputs audio signals from the DCP 507 to the speaker SP.

Meanwhile, the micro controller 512 operates the flash 12 by controlling the operation of a flash controller 511 according to a signal from the FS 19.

Figure 5:
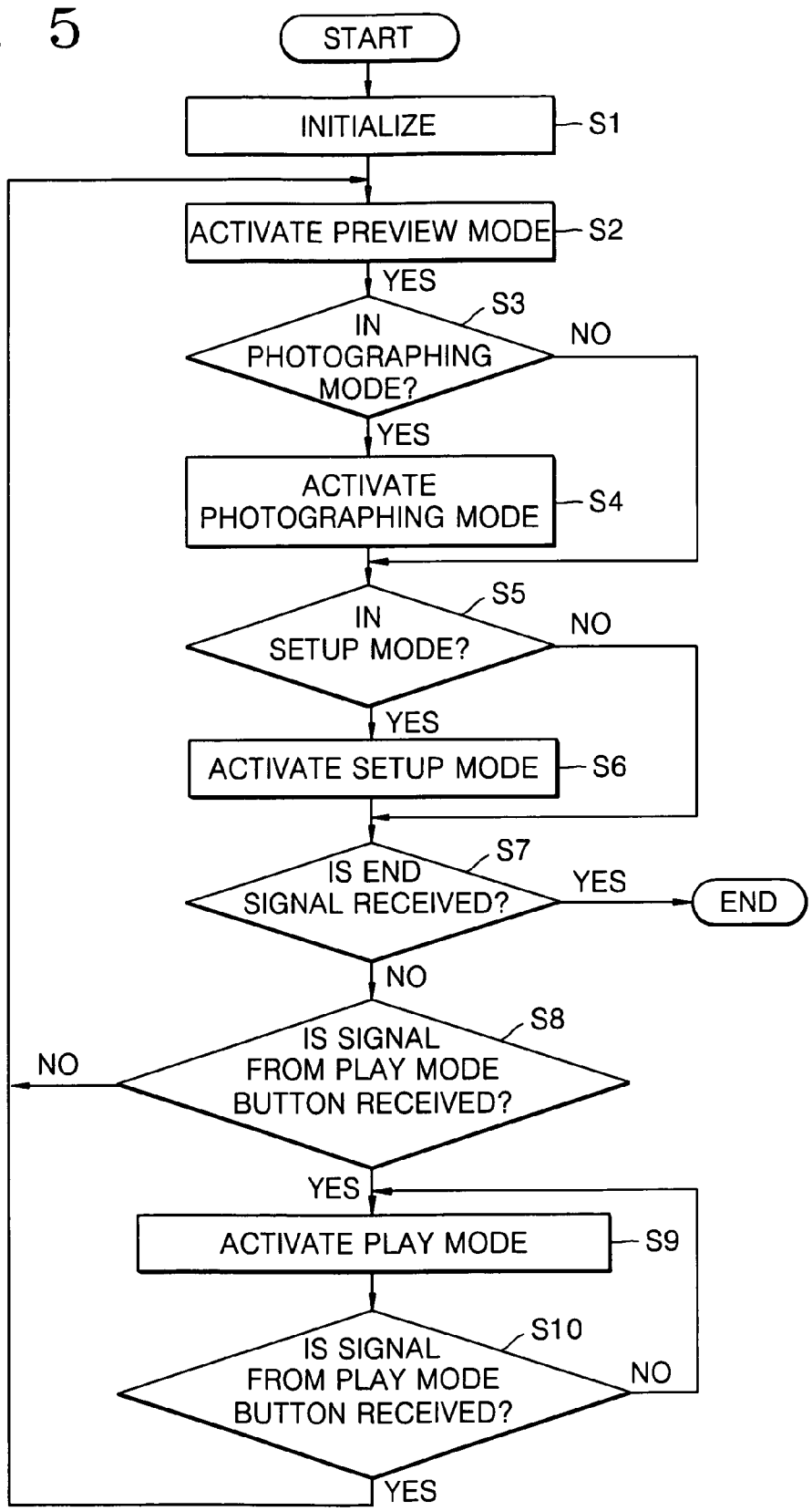
FIG. 5 is a flowchart illustrating a main procedure of a digital camera processor illustrated in FIG. 3.

FIG. 5 is a flowchart illustrating a main procedure of the DCP 507 illustrated in FIG. 3. The main procedure of the DCP 507 will now be described with reference to FIGS. 1 through 5 and FIGS. 9 and 10.

When power is supplied to the digital camera 1, the DCP 507 is initialized (Operation S1). When operation S1 is performed, the DCP 507 activates a preview mode (Operation S2). In this preview mode, an input image is displayed on the color LCD panel 35. Operations related to this preview mode will be described in more detail with reference to FIG. 6 later.

Next, when in the photographing mode in which the signal SH1 is turned "on" by depressing the shutter release button 13 to the first step (Operation S3), the DCP 507 operates a photographing mode (Operation S4). Whether the flash 12 is on/off is determined in the photographing mode. The procedure followed in informing the user of the "on" state of the flash 12 if it is determined that the flash is "on," and triggers the flash 12 after a predetermined amount of time has passed or after receiving a consent signal, will be described in more detail with reference to FIG. 7 or 8 later.

Then, if signals corresponding to settings of a setup mode are among signals input from the user input unit INP (Operation S5), the setup mode is activated so that operating conditions can be set according to the signals input from the user input unit INP (Operation S6).

There is a plurality of setup modes, and the protection mode which protects the subject from the flash 12 is shown in FIGS. 9 and 10. This protection mode is set by user manipulation in a camera setup mode. The protection mode includes the automatic protection mode and the manual protection mode. The automatic protection mode, in this regard, notifies the user of the state of the flash 12 for a predetermined time and then photographs an image. The method of informing or notifying the user of the state of the flash 12 includes a no alert mode, an alert display mode, an alarm mode, and a vibration mode. The manual protection mode, on the other hand, notifies the user of the state of the flash 12 and operates the flash 12 after receiving a consent signal from the user. The method of informing or notifying the user can utilize an alert display mode, an alarm mode, and/or a vibration mode.

If an end signal is not generated, the DCP 507 continues to perform the following operations (Operation S7).

First, if a signal from the play mode button 30 in the user input unit INP is generated (Operation S8), a play mode is activated (Operation S9). In the play mode, operating conditions are set according to the signals input from the user input unit INP, and the play operation is performed. Next, if a signal from the play mode button 30 is again generated (Operation S10), the previous operations are repeated.

Figure 6:
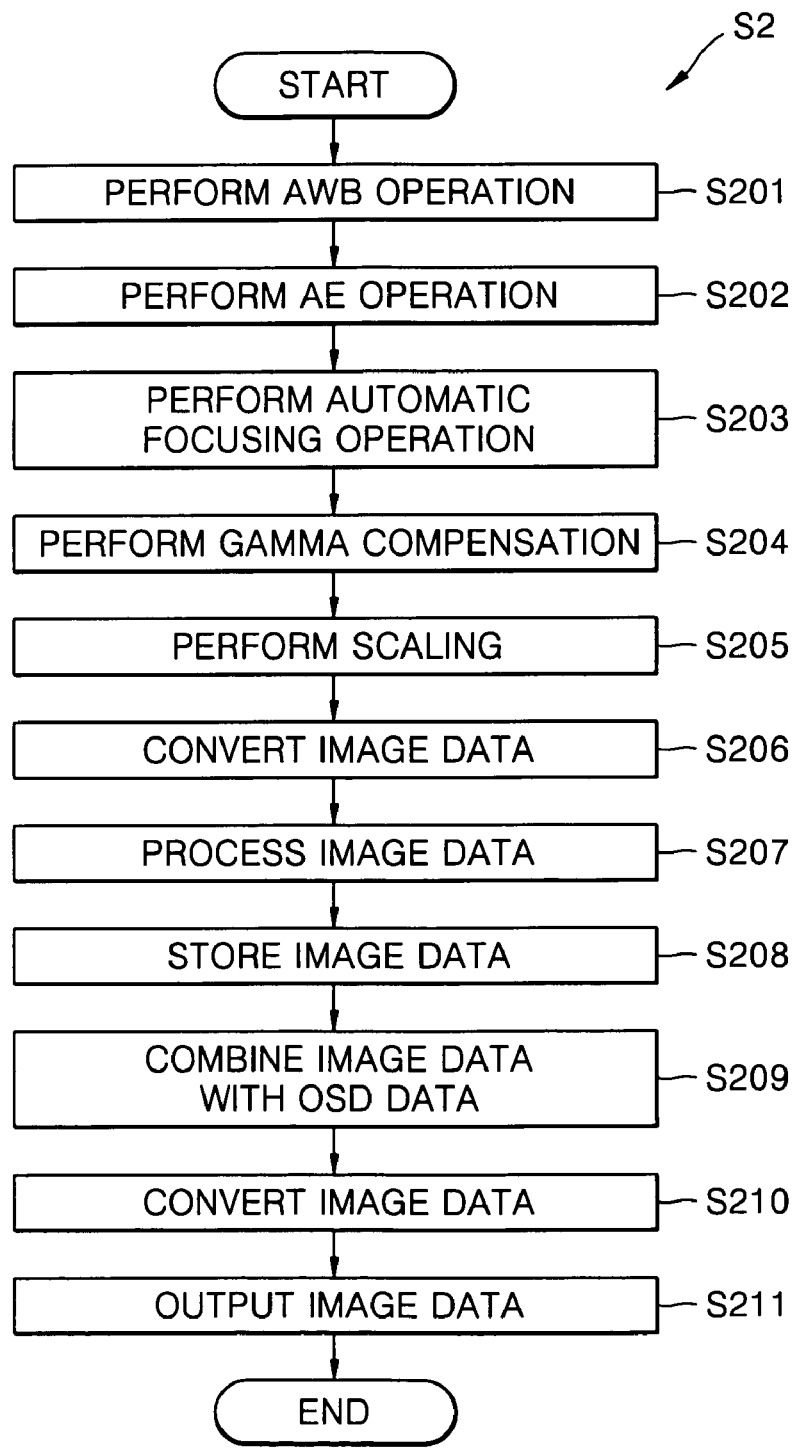
FIG. 6 is a flowchart illustrating a procedure for performing a preview mode described in FIG. 5.

FIG. 6 is a flowchart illustrating an procedure for performing the preview mode (Operation S2) shown in FIG. 5. The procedure of operating the preview mode (Operation S2) shown in FIG. 5 will be described below with reference to FIGS. 1 through 3 and FIG. 6.

First, the DCP 507 performs an automatic white balance (AWB) operation and sets parameters related to the white balance (Operation S201).

When in an automatic exposure (AE) mode (Operation S202), the DCP 507 calculates an exposure level corresponding to the brightness of the image to be photographed, and sets a shutter speed by driving the aperture driving motor MA according to the calculated exposure level (Operation S203).

Then, the DCP 507 performs gamma compensation on the input image data (Operation S204) and scales the gamma compensated input image data so that it fits the display size (Operation S205).

Next, the DCP 507 converts the form of the scaled input image data from red-green-blue to brightness-chromaticity (Operation S206). The DCP 507 processes the input image data in relation to, for example, a resolution and a display location, and performs filtering (Operation S207).

Afterwards, the DCP 507 temporary stores the input image data in the DRAM 504 (see FIG. 3) (Operation S208).

The DCP 507 combines the input image data temporary stored in the DRAM 504 with on-screen display (OSD) data (Operation S209). Then, the DCP 507 converts the form of the combined image data from brightness-chromaticity to red-green-blue (Operation S210) and outputs the image data in the converted form to the LCD driving unit 514 (see FIG. 3) (Operation S211).

Figure 7:
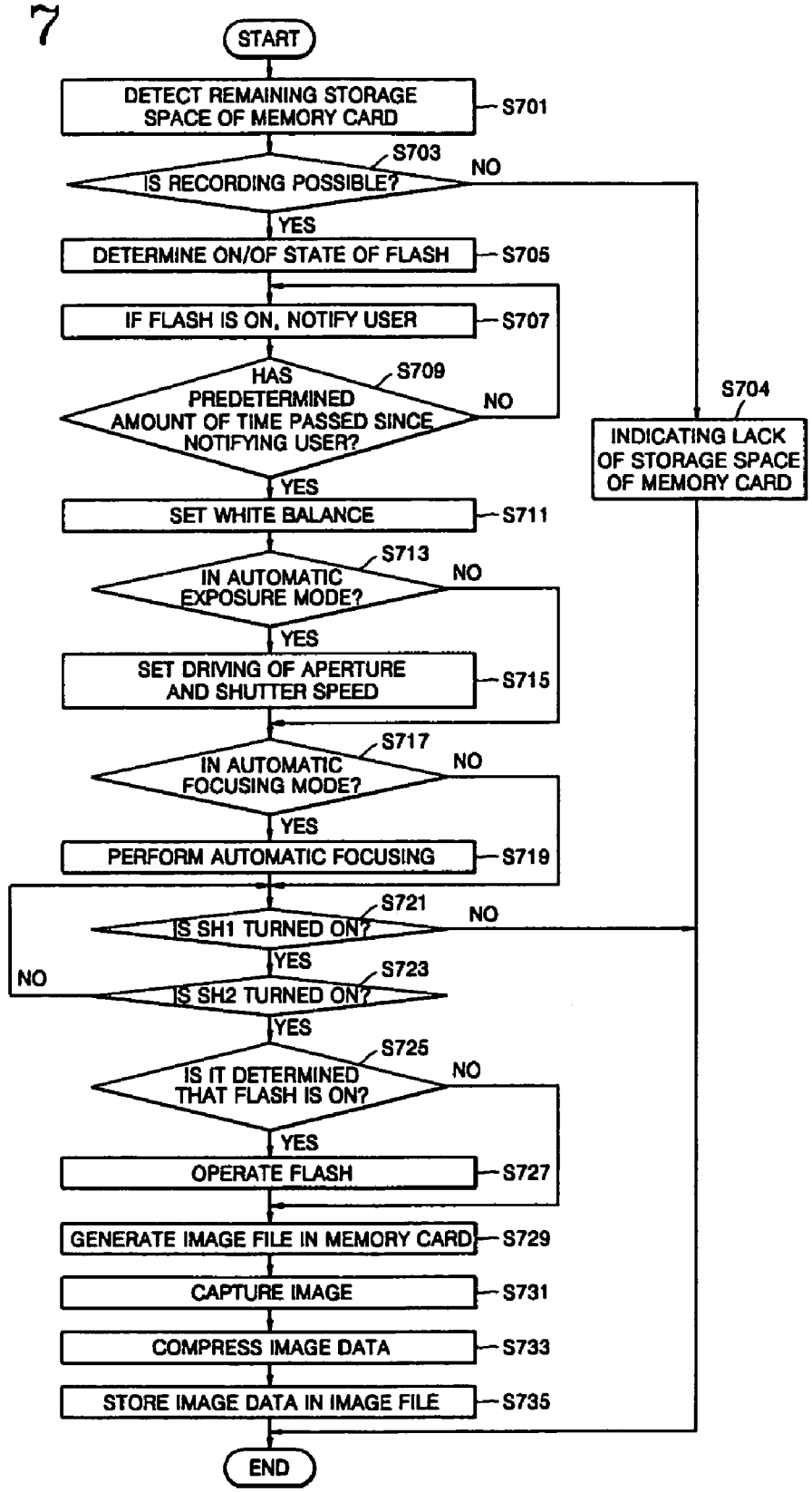
FIG. 7 is a flowchart illustrating an exemplary procedure of a photographing mode of FIG. 5 according to an embodiment of the present invention.

FIG. 7 is a flowchart illustrating an exemplary procedure of the photographing mode shown in FIG. 5 according to an embodiment of the present invention.

With reference to FIGS. 1 through 3, 7, and 9, the procedure of the photographing mode (Operation S4) of FIG. 5 having the automatic protection mode that protects the subject from the flash 12 set is as follows. This procedure starts when the signal SH1 is turned "on" by depressing the shutter release button 13 to the first step. Here, the current location of the zoom lens ZL (see FIG. 4) is already set.

The DCP 507 detects the remaining storage space of the memory card (Operation S701) and checks whether it is possible to store digital image signals (Operation S703). If there is not enough storage space, the DCP 507 indicates lack of storage space in the memory card, and then terminates the photographing mode (Operation S704). If there is enough storage space, the following operations are performed.

First, the DCP 507 determines the on/off state of the flash 12 (Operation S705). In particular, in the automatic flash mode, if the brightness of incident light reflected from a subject or the background is below a predetermined standard amount, it is determined that the flash 12 is "on." If the brightness of incident light reflected from a subject or the background is higher than a predetermined standard amount, it is determined that the flash 12 is "off." If the flash mode is set to the fill-in mode, the red-eye reduction mode, or the slow-shutter mode, it is determined that the flash 12 is "on." The flash 12 is determined to be "off" if it is in the flash off mode.

Next, if the result of the determination indicates that the flash 12 is "on," the user is informed (Operation S707). Conventionally, the DCP 507 displayed little icons on the screen of the color LCD panel 35 for the numerous flash modes. However, the user may not always easily recognize the icons. In particular, in the automatic flash mode, the user may not know the on/off state of the flash 12. To prevent this, the present invention determines the on/off state of the flash 12, and if the flash 12 is determined to be "on," an alerting display in the form of text or an icon is displayed on the screen of the color LCD panel 35, an alarm sound is produced via the speaker SP, and/or vibration is produced to alert the user of the determination result. This will be described in more detail with reference to FIGS. 11 through 14.

Next, it is determined whether a predetermined amount of time has passed since the user is informed or notified of the determination result (Operation S709). The DCP 507 notifies the user of the determination for the predetermined length of time so that the user is fully aware of the "on" state of the flash 12. Operation 707 is repeated continually for the predetermined length of time. The predetermined length of time may be set to 2 to 3 seconds, or any length of time that is long enough for the user to recognize the determination result. Thus, there are numerous possibilities for setting the predetermined length of time.

The DCP 507 performs white balance according to the currently set photographing conditions, and sets parameters related to the white balance (Operation S711). Then, when in the AE mode (Operation S713), the DCP 507 calculates the exposure level corresponding to the brightness of the area to be photographed, drives the aperture driving motor $M_A$ according to the calculated exposure level, and sets a shutter speed (Operation S715).

When in the automatic focusing mode (Operation S717), the DCP 507 performs automatic focusing and drives the focus lens FL (Operation S719).

If the signal SH1 is turned "on" by the user by pressing the shutter release button 13 to the first step, the DCP 507 continues to perform the following operations (Operation S721).

First, the DCP 507 checks whether the signal SH2 is turned "on" (Operation S723). If the signal SH2 is not turned on, due to no pressing by the user of the shutter release button 13 to the second step, then the DCP 507 repeats operations S721 through S723.

If the signal SH2 is turned "on," due to pressing by the user of the shutter release button 12 to the second step, then the DCP 507 operates the flash 12, if the result of the determination indicates that the flash 12 is "on" (Operation S725). If the result of the determination indicates that the flash 12 is "off," then the flash 12 does not operate.

Next, the DCP 507 generates an image file in the memory card, which is the storage medium (Operation S729), and the DCP 507 captures image data (Operations 731). That is, the DCP 507 receives image data from the CDS-ACD device 501. Afterwards, the DCP 507 compresses the received image data (Operation S733), and stores the compressed image data in the image file (Operation S735).

Figure 8:
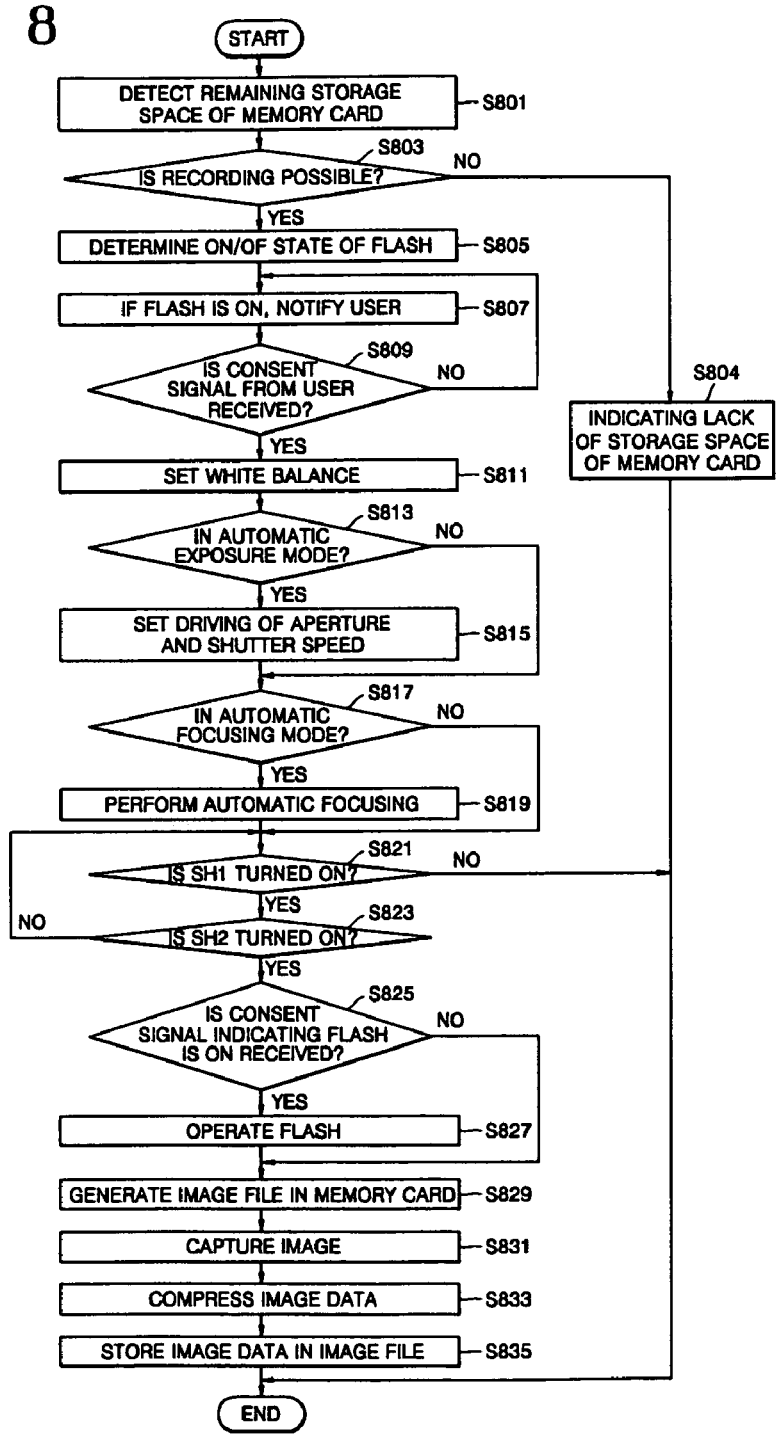
FIG. 8 is a flowchart illustrating another exemplary procedure of the photographing mode of FIG. 5 according to an embodiment of the present invention.

FIG. 8 is a flowchart illustrating another exemplary procedure of the photographing mode shown in FIG. 5 according to an embodiment of the present invention.

The procedure for performing the photographing mode (Operation S4) of FIG. 5 with the manual protection mode which protects the subject from the flash 12 set is described below with reference to FIGS. 1 through 3, 8, and 10. This procedure starts when the signal SH1 is turned "on" by depressing by the user of shutter release button 13 to the first step. Here, the current location of the zoom lens ZL (see FIG. 4) is already set.

The DCP 507 detects the remaining storage space of the memory card (Operation S801), and checks whether it is sufficient to store digital image signals (Operation S803). If there is not enough storage space, the DCP 507 indicates the lack of storage space in the memory card, and then terminates the photographing mode (Operation S804). If there is enough storage space, the following operations are performed.

First, the DCP 507 determines whether the flash 12 is "on" or "off" (Operation S805). In particular, in the automatic flash mode, if incident light reflected from a subject or the background is below a predetermined standard brightness, it is determined that the flash 12 is "on," and if the incident light is brighter than the predetermined standard brightness, it is determined that the flash 12 is "off." If the flash mode is set to the fill-in mode, the red-eye reduction mode, or the slow-shutter mode, it is determined that the flash 12 is "on." The flash 12 is determined to be "off" if it is in the flash off mode.

Next, if the result of the determination indicates that the flash 12 is "on," the user is informed (Operation S807) of the "on" state of the flash. Conventionally, the DCP 507 displayed little icons on the screen of the color LCD panel 35 for the various flash modes. However, the user may not always easily recognize the icons. Particularly, in the automatic flash mode, the user may not know whether the flash 12 is "on" or "off." to prevent this, the present invention determines the on/off state of the flash 12, and if the flash 12 is determined to be "on," an alerting display in the form of text or an icon is displayed on the screen of the color LCD panel 35, an alarm sound is produced via the speaker SP, or vibration is produced to alert the user of the determination result. This will be described in more detail with reference to FIGS. 11 through 14.

Next, it is determined whether a consent signal of the determination result by the user is received (Operation S809). If the consent signal of the determination result is input by the user via the user input unit INP, the DCP 507 finalizes the on/off state of the flash 12 in the manner as indicated by the consent signal. If the consent signal is not received, the next operation is not performed.

Next, the DCP 507 performs white balance according to the currently set photographing conditions, and sets parameters related to the white balance (Operation S811).

Then, when in the AE mode (Operation S813), the DCP 507 calculates the exposure level corresponding to the brightness of the area to be photographed, drives the aperture driving motor $M_A$ according to the calculated exposure level, and sets a shutter speed (Operation S815).

When in the automatic focusing mode (Operation S817), the DCP 507 performs automatic focusing and drives the focus lens FL (Operation S819).

If the signal SH1 is turned on by the user by pressing the shutter release button 13 to a first step, the DCP 507 continues to perform the following operations (Operation S821).

First, the DCP 507 checks whether the signal SH2 is turned "on" (Operation S823). If the signal SH2 is "off," due to no pressing by the user of the the shutter release button 13 to the second step, then the DCP 507 repeats operations S821 through S823.

If the signal SH2 is turned "on" due to pressing by the user of the shutter release button 13 to the second step, and a consent signal is received from the user consenting to flash photographing, following the informing of the user of the "on" state of the flash, then the DCP 507 operates the flash 12 (Operation S825). If the received consent signal indicates that the flash 12 is "off," then the flash 12 does not operate.

Next, the DCP 507 generates an image file in the memory card, which is the storage medium (Operation S829), and the DCP 507 captures image data (Operations 831). That is, the DCP 507 receives image data from the CDS-ACD device 501. Afterwards, the DCP 507 compresses the received image data (Operation S833), and stores the compressed image data in the image file (Operation S835).

FIGS. 9A through 9D are views for explaining a method of selecting the automatic protection mode as the setup mode of FIG. 5.

Figure 9A:
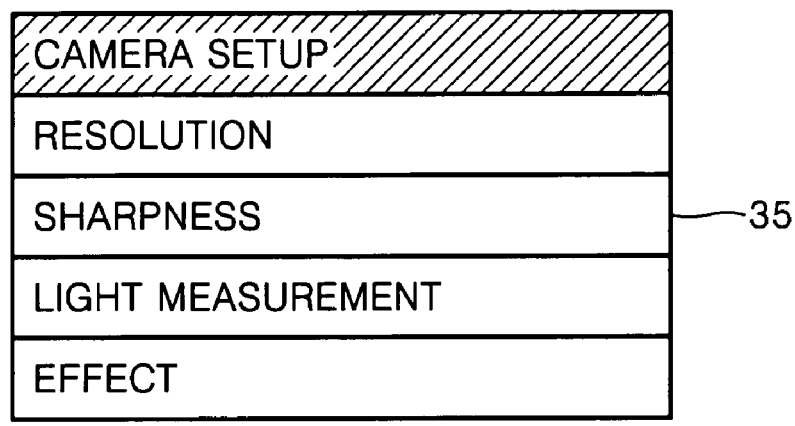
FIGS. 9A through 9D are views for explaining a method of selecting an automatic protection mode in a setup mode shown in FIG. 5.

Referring to FIG. 9A, first, a setup mode is selected. The setup mode may be selected by pressing the menu/OK button 15-5. If the menu/OK button 15-5 is pressed, a menu such as that illustrated in FIG. 9A is displayed on the screen of the color LCD panel 35. That is, a menu for selecting a camera setup mode, a resolution mode, a sharpness mode, a light measurement mode, and an effect mode is displayed, and the camera setup mode is selected. The selection may be made by pressing the audio memo/top button 15-1 or the macro/down button 15-2.

Figure 9B:
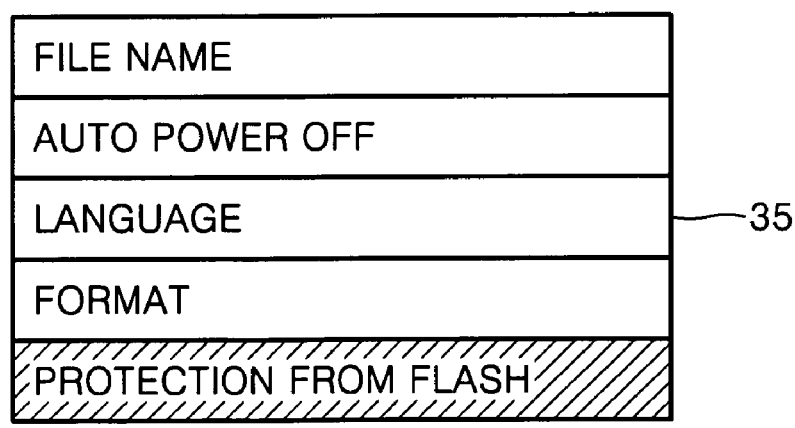

Next, a menu such as that shown in FIG. 9B is displayed on the screen of the color LCD panel 35 by selecting the camera setup mode. A protection mode which protects the subject from the flash 12 may be selected by a user from among a file-name mode, an automatic power off mode, a language mode, a format mode, and the protection mode that protects the subject from the flash 12, by using the audio memo/top button 15-1 or the macro/down button 15-2.

Figure 9C:
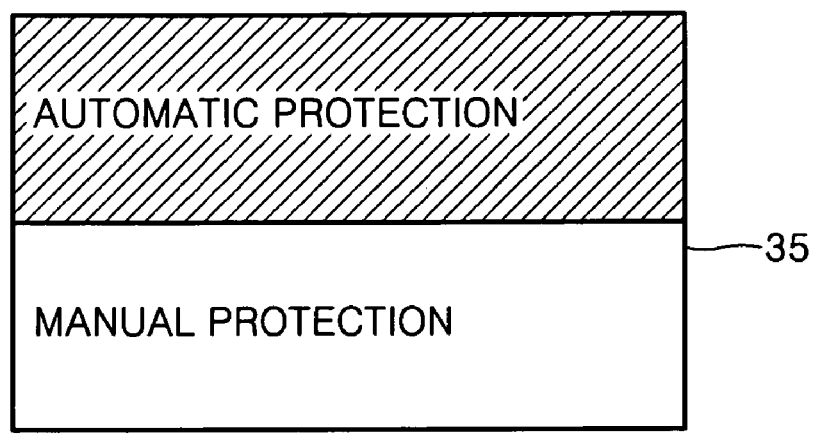

Then, a menu such as that shown in FIG. 9C is displayed on the screen of the color LCD panel 35 by selecting the protect mode which protects the subject from the flash 12. Using the audio memo/top button 15-1 or the macro/down button 15-2, the automatic protection mode may be selected from between the automatic protection mode and the manual protection mode. As described with reference to FIG. 7, the automatic protection mode determines the on/off state of the flash 12, notifies the user of the "on" state of the flash 12 if the determination result indicates that the flash 12 is "on," and photographs while the flash 12 is "on" if the signal SH2 from the shutter release button 13 is "on." Here, if the flash 12 is "off," the user is not notified of the "off" state.

Figure 9D:
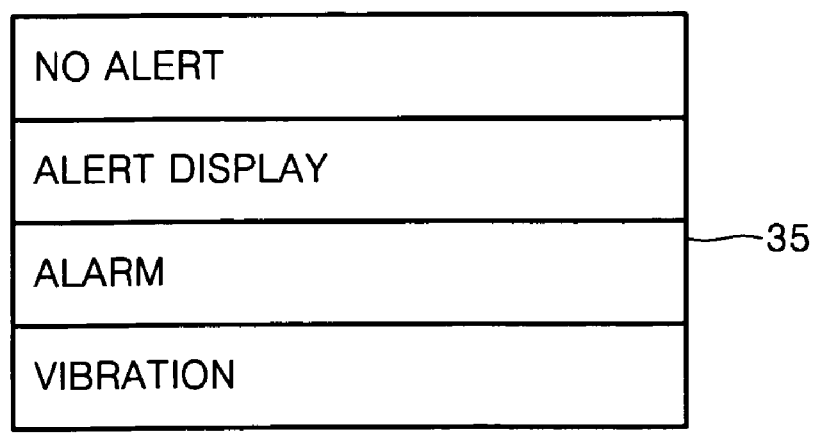

Then, a menu such as that shown in FIG. 9D is displayed on the screen of the color LCD panel 35 by selecting the automatic protection mode. A no alert mode, an alert displaying mode, an alarm mode, or a vibration mode may be selected by a user by through use of the audio memo/top button 15-1 or the macro/down button 15-2.

The no alert mode does not inform the user when the flash 12 is "on."

The alert displaying mode displays an alert that the flash 12 is "on" on the screen of the color LCD panel 35 if the flash 12 is determined to be "on," in operation S707 in FIG. 7. The alert may be text or an icon. This will be described in more detail with reference to FIGS. 11 and 12.

The alarm mode outputs an alarm that the flash 12 is "on" via the speaker SP if the flash 12 is determined to be "on," in operation S707 in FIG. 7. This operation is described in more detail with reference to FIG. 13. The alarm is preset and may be output together with the text or icon displayed on the screen of the color LCD panel 35.

The vibration mode informs the user of the "on" state of the flash 12 using a vibrating device (not shown) within the digital camera 1 when it is determined that the flash 12 is "on," in operation S707 in FIG. 7. This is described in more detail with reference to FIG. 14. The alerting text or icon may be displayed on the screen of the color LCD panel 35 along with the vibration.

FIGS. 10A through 10D are views for explaining a method of selecting the manual protection mode as a setup mode in the process shown in FIG. 5.

Figure 10A:
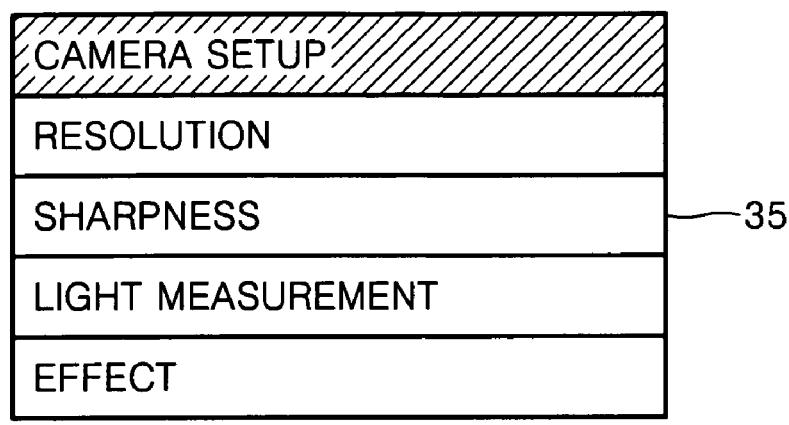
FIGS. 10A through 10D are views for explaining a method of selecting a manual protection mode in a setup mode described in FIG. 5.

Referring to FIG. 10A, first, a setup mode is selected. The setup mode may be selected by pressing the menu/OK button 15-5. If the menu/OK button 15-5 is pressed, a menu such as illustrated in FIG. 10A is displayed on the screen of the color LCD panel 35. That is, a menu for selecting a camera setup mode, a resolution mode, a sharpness mode, a light measurement mode, and an effect mode is displayed, and the camera setup mode is selected. The selection may be made by pressing the audio memo/top button 15-1 or the macro/down button 15-2.

Figure 10B:
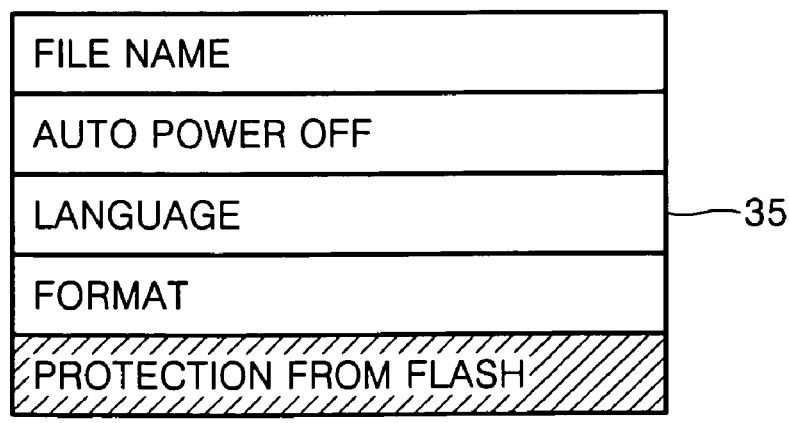

Next, a menu such as shown in FIG. 10B is displayed on the screen of the color LCD panel 35 by selecting the camera setup mode. A protection mode which protects the subject from the flash 12 may be selected from among a file-name mode, an automatic power off mode, a language mode, a format mode, and the protection, by using the audio memo/top button 15-1 or the macro/down button 15-2.

Figure 10C:
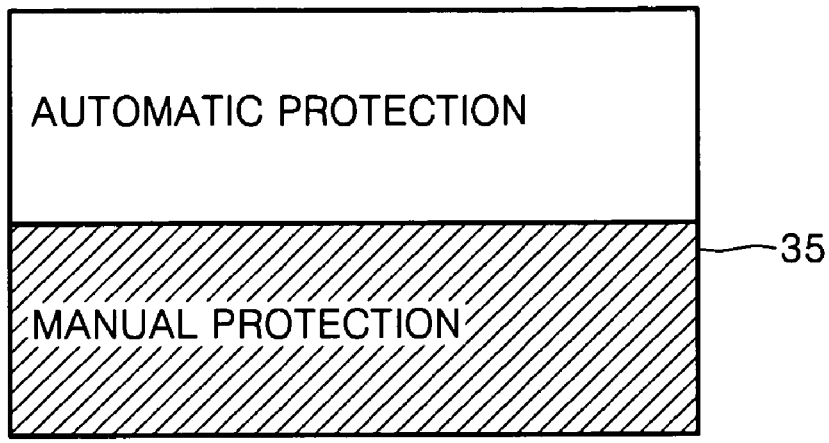

Then, a menu such as shown in FIG. 10C is displayed on the screen of the color LCD panel 35 by selecting the protection mode. Using the audio memo/top button 15-1 or the macro/down button 15-2, the manual protection mode may be selected by the user from among the automatic protection mode and the manual protection mode. As described with reference to FIG. 8, the manual protection mode determines the on/off state of the flash 12, notifies the user if it is determined that the flash 12 "on," receives a consent signal from the user as to whether photographing will occur with or without the flash, following the informing of the user of the "on" state of the flash 12, and photographs with or without the flash in the manner as indicated by the consent signal, following the pressing by the user of the shutter release button to a second step. If the consent signal from the user indicates that photographing will occur with the flash 12 "on," then photographing is performed using the flash 12, and if the consent signal from the user indicates that photographing will occur with the flash 12 "off," then photographing is performed without the flash 12. If it is determined that the flash 12 is "off," the user is not notified.

Figure 10D:
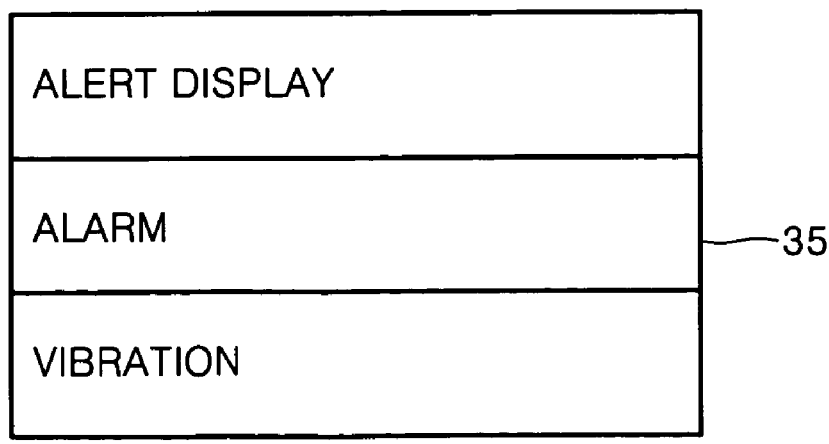

Then, a menu such as shown in FIG. 10D is displayed on the screen of the color LCD panel 35 by selecting the manual protection mode. An alert displaying mode, an alarm mode, or a vibration mode may be selected by the user by using the audio memo/top button 15-1 or the macro/down button 15-2.

The alert displaying mode displays an alert that the flash 12 is "on" on the screen of the color LCD panel 35 if the flash 12 is determined to be "on," in operation S707 in FIG. 7. The alert may be a predetermined alerting text or icon. This will be described in more detail with reference to FIGS. 11 and 12.

The alarm mode outputs an alarm sound indicating that the flash 12 is "on" via the speaker SP if the flash 12 is determined to be "on," in operation S707 in FIG. 7. This operation will be described in more detail with reference to FIG. 13. The alarm is predetermined or preset and may be combined with the alerting text and/or an icon, in a display on the screen of the color LCD panel 35.

The vibration mode informs the user of the "on" state of the flash 12 using a vibrating device (not shown) within the digital camera 1 when it is determined that the flash 12 is "on," in operation S707 in FIG. 7. This will be described in more detail with reference to FIG. 14. The alerting text or icon may be displayed on the screen of the color LCD panel 35 along with the vibration.

Figure 11A:
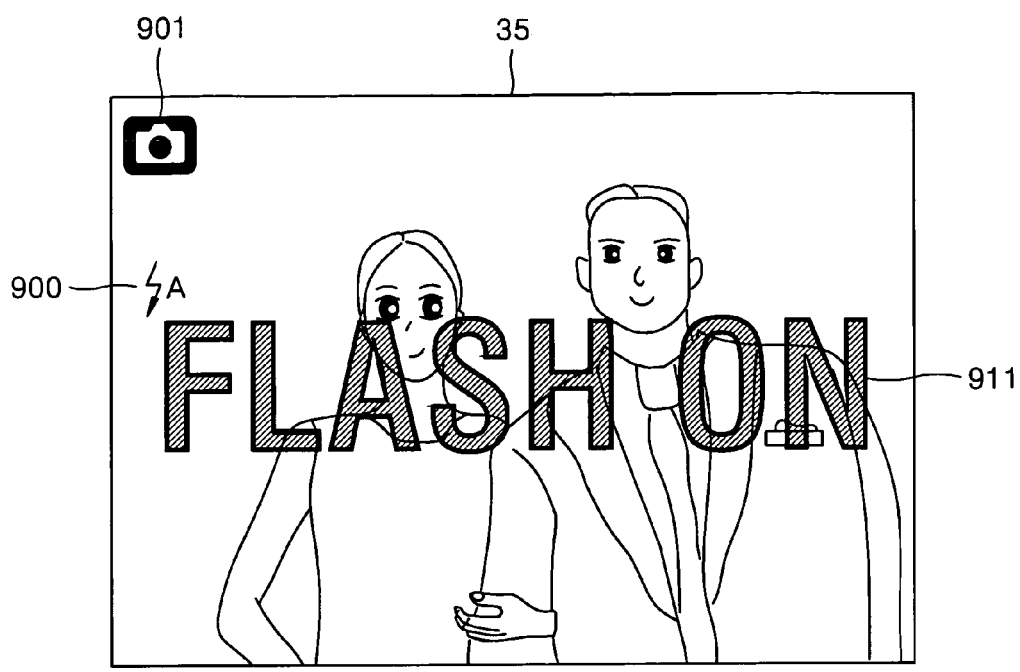
FIGS. 11A and 11B are examples of notifying a user whether a flash is turned "on" or "off," as performed in methods shown in FIGS. 7 and 8.
Figure 11B:
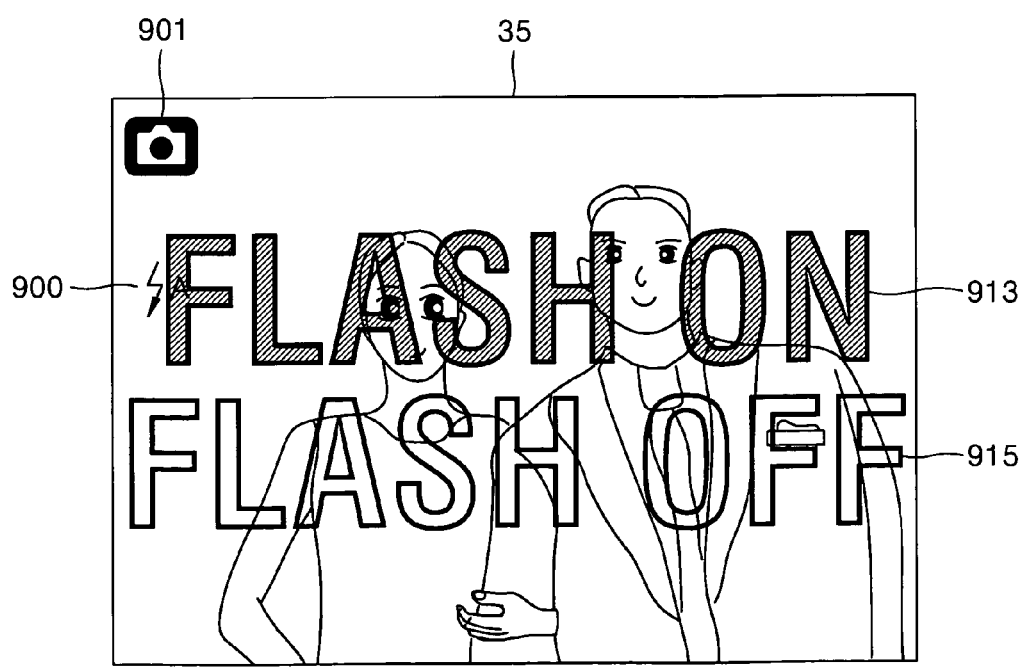

FIGS. 11A and 11B are examples of notifying the user whether the flash 12 is turned "on" or "off," as is performed in the methods of FIGS. 7 and 8. The following description makes reference to FIGS. 1 through 3, and 7 through 11.

FIG. 11A is a view for explaining the text display which notifies the user that the flash 12 is "on," following a setting by the user of the protection mode and a selection by the user of an automatic protection mode. When the signal SH1 is turned "on" by the user by pressing the shutter release button 13 to the first step, then an automatic flash mode icon 900, an icon 901 indicating the automatic photographing mode, and an image of a subject may be displayed on the screen of the color LCD panel 35. After determining the state of the flash 12, if the determination result shows that the flash 12 is "on," then the DCP 507 displays, for example, predetermined text on the screen of the color LCD panel 35. The predetermined text, in this regard, may be any text that clearly informs the user that the flash 12 is "on." The predetermined text, for example, may be "FLASH ON" 911 as illustrated in FIG. 11A. "FLASH ON" 911 may be displayed across the entire screen of the color LCD panel 35 so that the user may easily see it. The consent signal is not input by the user, following a setting by the user of the protection mode and a selection by the user of an automatic protection mode. Therefore, the mode for turning the flash 12 on/off may be omitted.

In flash modes other than the automatic flash mode, it is determined whether the flash 12 is on/off and the user is informed of the result. Therefore, if it is determined that the flash 12 is "on," "FLASH ON" 911 illustrated in FIG. 11A, for example, may be displayed on the screen of the color LCD panel 35. Similarly, when set to another flash mode, an icon corresponding to that flash mode can be displayed in the top left corner of the color LCD panel 35 instead of the automatic flash mode icon 900.

FIG. 11B is a view for explaining the text display which notifies the user that the flash 12 is "on," following a setting by the user of the protection mode and a selection by the user of a manual protection mode. When the signal SH1 is turned "on" by the user by pressing the shutter release button 13 to the first step, then an automatic flash mode icon 900, an icon 901 indicating the automatic photographing mode, and an image of a subject may be displayed on the screen of the color LCD panel 35. After determining the on/off state of the flash 12, if the determination result shows that the flash 12 is "on," the DCP 507, for example, displays predetermined text on the screen of the color LCD panel 35. The predetermined text, in this regard, can be any text that clearly informs the user that the flash 12 is "on." The predetermined text, for example, may be "FLASH ON" 913 as illustrated in FIG. 11B. "FLASH ON" 913 may be displayed across the entire screen of the color LCD panel 35 so that the user can easily see it. Also, "FLASH OFF" 915 may be simultaneously displayed below "FLASH ON" 913 to enable the user to input the consent signal. When the flash 12 is "on," "FLASH ON" 913 may appear bolder than "FLASH OFF" 915.

The consent signal may be generated, as is performed in the method shown in FIG. 8, by selecting "FLASH ON" 913 or "FLASH OFF" 915 using the audio memo/top button 15-1 or the macro/down button 15-2 and then pressing the menu/OK button 15-5.

In flash modes other than the automatic flash mode, determination of the on/off state of the flash 12 occurs, and the user is informed of the determination result. Therefore, if it is determined that the flash 12 is "on," then "FLASH ON" 911 illustrated in FIG. 11B, for example, may be displayed on the screen of the color LCD panel 35. However, when set to another flash mode, an icon corresponding to that flash mode can be displayed in the top left corner of the color LCD panel 35 instead of the automatic flash mode icon 900.

Figure 12A:
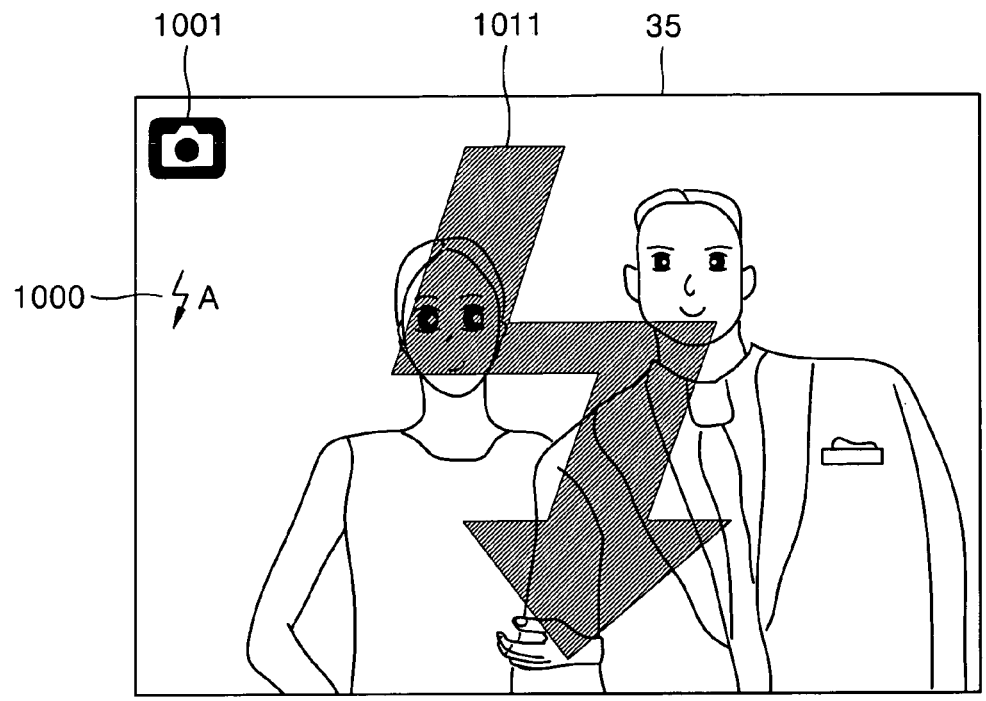
FIGS. 12A and 12B are other examples of notifying the user whether the flash is turned "on" or "off," as performed in methods shown in FIGS. 7 and 8.
Figure 12B:
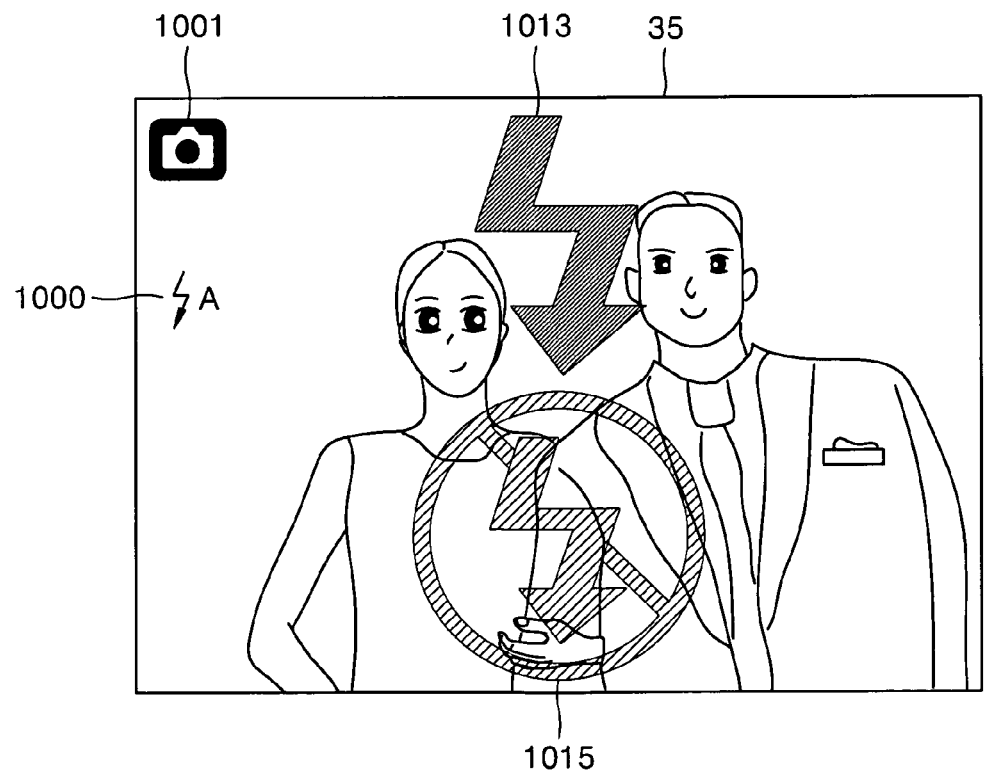

FIGS. 12A and 12B are other examples of notifications to the user as to whether the flash 12 is turned "on" or "off," as is performed in the methods of FIGS. 7 and 8. The following description makes reference to FIGS. 1 through 3, and 7 through 12.

FIG. 12A is a view for explaining the displaying of an icon which notifies the user that the flash 12 is "on," following a setting by following a setting by the user of the protection mode which protects the subject from the flash 12 and a selection by the user of an automatic protection mode. When the signal SH1 is turned "on" by the user by pressing the shutter release button 13 to the first step, an automatic flash mode icon 1000, an icon 1001 of the automatic photographing mode, and an image of a subject may be displayed on the screen of the color LCD panel 35. If it is determined that the flash 12 is "on," the DCP 507 displays, for example, a predetermined icon on the screen of the color LCD panel 35. The predetermined icon may be any icon that clearly informs the user that the flash 12 is "on," such as an icon 1011 illustrated in FIG. 12A. The icon 1011 may be displayed across the entire screen of the color LCD panel 35 so that the user can easily see it. Since the consent signal is not input by the user when the automatic protection mode is selected by the user following the setting by the user of the protection mode, the mode for turning the flash 12 on/off may be omitted.

In flash modes other than the automatic flash mode, whether the flash 12 is on/off is determined and the user is informed of the result. Therefore, if it is determined that the flash 12 is "on," the alerting icon 1011 illustrated in FIG. 11A may be displayed. However, when set to another flash mode, an icon corresponding to that flash mode is displayed in the top left corner of the color LCD panel 35 instead of the automatic flash mode icon 1000.

FIG. 12B is a view for explaining an icon display which notifies the user that the flash 12 is "on," following a setting by the user of the protection mode and a selection by the user of a manual protection mode. When the signal SH1 is turned "on" by the user by pressing the shutter release button 13 to the first step, an automatic flash mode icon 1000, an icon 1001 representing the automatic photographing mode, and an image of a subject may be displayed on the screen of the color LCD panel 35. If it is determined that the flash 12 is "on," the DCP 507 displays, for example, a predetermined alerting icon on the screen of the color LCD panel 35. The predetermined alerting icon can be any icon that clearly informs the user that the flash 12 is "on," such as an icon 1013 illustrated in FIG. 12B. The icon 1013 may be displayed across the entire screen of the color LCD panel 35 so that the user can easily see it. Also, an icon 1015 may be simultaneously displayed below the icon 1013 to enable the user to input the consent signal. When it is determined that the flash 12 is "on," the icon 1013 may appear bolder than the icon 1015.

The consent signal may be generated by the user, as is shown in the method of FIG. 8, by selecting icon 1013 or icon 1015 using the audio memo/top button 15-1 or the macro/down button 15-2, and by pressing the menu/OK button 15-5.

In flash modes other than the automatic flash mode, it is determined whether the flash 12 is on/off, and the user is informed of the result. Therefore, if it is determined that the flash 12 is "on," the alerting icon 1013 illustrated in FIG. 11B may be displayed. However, when set to another flash mode, an icon corresponding to that flash other mode is displayed in the top left corner of the color LCD panel 35 instead of the automatic flash mode icon 1000.

Figure 13:
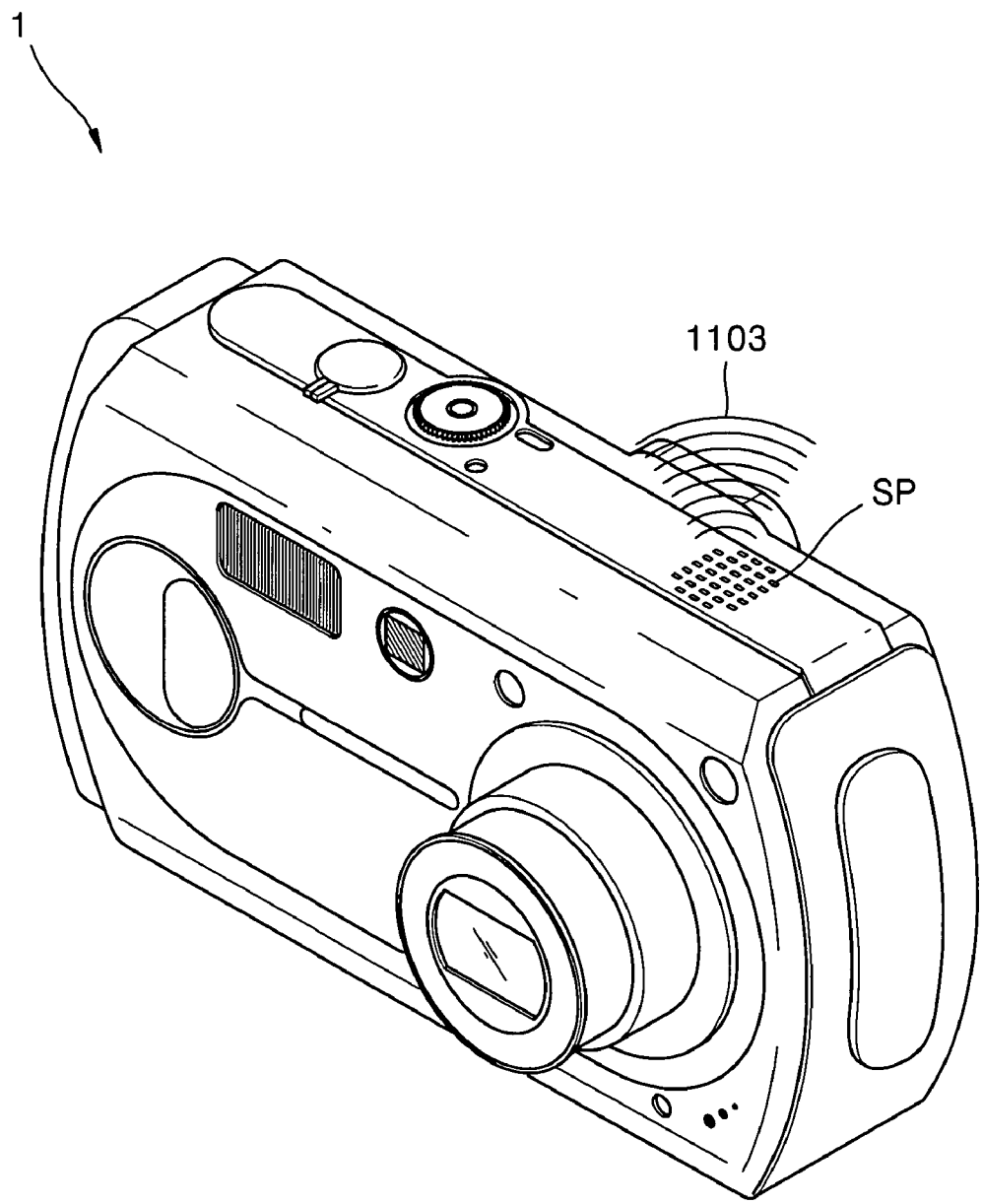
FIG. 13 is another example of notifying the user whether the flash is turned "on" or "off," as performed in methods shown in FIGS. 7 and 8.

FIG. 13 is another example of a mode of informing or notifying the user whether the flash 12 is turned "on" or "off," as is performed in the methods shown in FIGS. 7 and 8. The following description makes references to FIGS. 1 through 5 and 7 through 13.

The DCP 507 can inform the user that the flash 12 is "on" by outputting a predetermined alarm 1103 via the speaker SP. Alternatively, or in addition, the DCP 507 can simultaneously display the predetermined alerting text "FLASH ON" 911 or "FLASH OFF" 913 or alerting icons 1011 or 1013 on the screen of the color LCD panel 35, as illustrated in FIG. 11 or 12.

Figure 14:
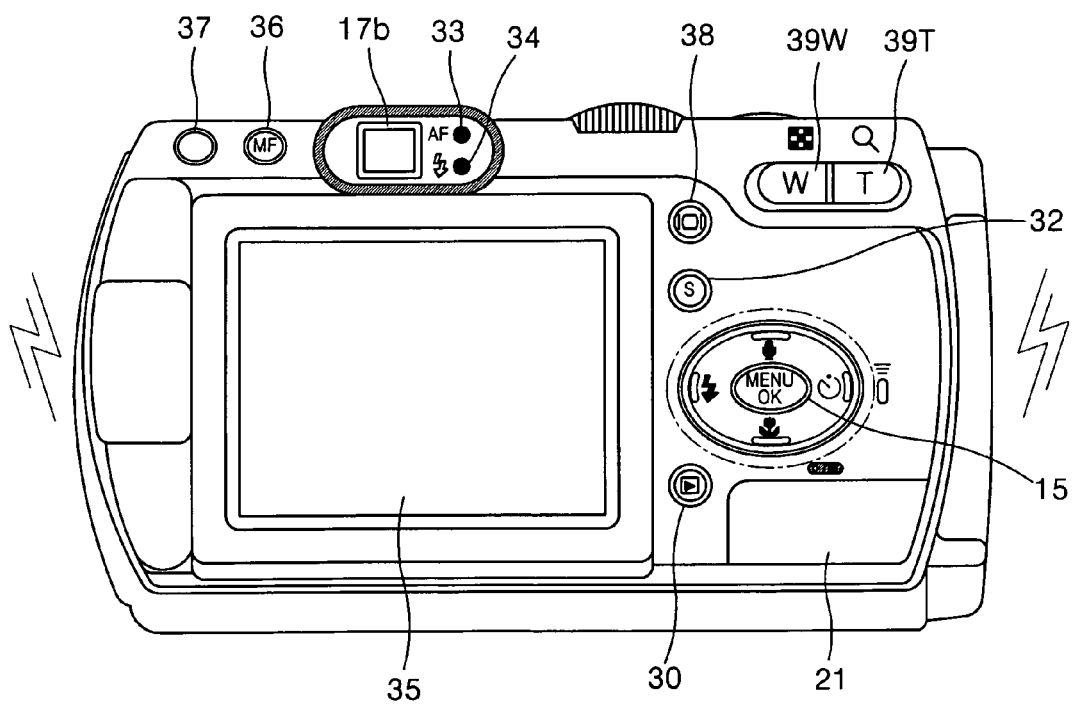
FIG. 14 is another example of notifying the user whether the flash is turned "on" or "off," as performed in methods shown in FIGS. 7 and 8.

FIG. 14 is another example of a mode of informing or notifying the user whether the flash 12 is turned "on" or "off," as is performed in the methods of FIGS. 7 and 8.

Referring to FIGS. 1 through 5 and 7 through 14, the DCP 507 may inform notify the user that the flash 12 is "on" via the vibrating device of the digital camera 1. Also, simultaneously, the DCP 507 can display the predetermined alerting text "FLASH ON" 911 or 913 or alerting icons 1011 or 1013 on the screen of the color LCD panel 35, as illustrated in FIG. 11 or 12, while vibrating the digital camera 1.

The above-described method of controlling the digital photographing apparatus may be adopted in a digital photographing apparatus. Therefore, the present invention also provides a digital photographing apparatus utilizing the method. The digital camera, which is one type of digital photographing apparatus, may include the automatic protection mode and the manual protection mode of the protection mode which protects the subject from the flash 12 to prevent flashes without warning when photographing.

In the automatic protection mode, when the signal SH1 is turned "on" by the user by pressing the shutter release button 13 to the first step, the on/off state of the flash 12 is determined. If the flash 12 is determined to be "on," the user is informed. When the signal SH2 is turned "on" by the user by pressing the shutter release button 13 to the second step, the flash 12 operates when photographing.

In the manual protection mode, the on/off state of the flash 12 is determined when the signal SH1 is "on." If it is determined that the flash 12 is "on," the user is informed. If the signal SH2 is turned "on" after the consent signal is received from the user, the flash 12 operates according to the consent signal.

The method of informing the user of the determination result includes the alerting text "FLASH ON" 911 or 913 illustrated in FIG. 11A or 11B, the alerting icon 1011 or 1013 illustrated in FIG. 12A or 12B, the alarm 1103 illustrated in FIG. 13, and the vibration illustrated in FIG. 14.

The present invention has the following effects. First, when photographing using a digital photographing apparatus, especially a digital camera, the user is informed in advance of the photographing whether a flash will operate or not. Second, the user can select whether or not the flash activates during photographing through a simple operation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for controlling a flash on a digital photographing apparatus, the method comprising:
   detecting that a user has pressed a shutter release button of the digital photographing apparatus;
   in response to the detecting step, determining whether a flash of the digital photographing apparatus is set to be activated when a photograph is taken;
   based on the determining step, alerting the user that the flash is set to be activated;
   substantially simultaneously with the alerting step, prompting the user to choose between flashing or not flashing during photograph-taking; and
   taking a photograph only after the prompting step.

2. The method of claim 1, wherein it has been detected, during the detecting step, that the user has pressed the shutter release button to a first step, the method further comprising:
   detecting that the user has pressed the shutter release button to a second step, wherein the prompting step is performed in response to the step of detecting that the user has pressed the shutter release button to the second step.

3. The method of claim 2, wherein the taking step is performed only after a predetermined amount of time has elapsed since the prompting step was performed.

4. The method of claim 1, further comprising:
   after the prompting step, but prior to the taking step, receiving a consent Signal from the user confirming that the user wishes to take the photograph using the flash.

5. The method of claim 1, wherein the alerting step comprises activating an alert selected from a group consisting of an alerting display mode, an audible alarm, and a vibrating alert.

6. A method for taking a photograph, the method being performed by a digital photographing apparatus, the method comprising:
  (a) presenting an on-screen menu to a user;
  (b) receiving, from the user through the on-screen menu, an indication of whether the user wishes to put the digital photographing apparatus in a flash protection mode;
  (c) following step (b), receiving, from the user through on-screen menu, an indication of whether the flash protection mode is to be an automatic protection mode or a manual protection mode;
  (d) receiving, from the user an indication of what form a flash alert should take;
  (e) if, in step (c), an indication that the flash protection mode is to be an automatic protection mode is received, performing the steps of
    generating a first signal in response to the user pressing a shutter release button to a first step;
    in response to the first signal, alerting the user that the flash is on using the form of alert indicated in step (d);
    generating a second signal in response to the user pressing a shutter release button to a second step;
    in response to the second signal, taking a photograph without further prompting from the user;
  (f) if, in step (c), an indication that the flash protection mode is to be an manual protection mode is received, performing the steps of
    generating a first signal in response to the user pressing a shutter release button to a first step;
    in response to the first signal, alerting the user that the flash is on using the form of alert indicated in step (d);
    generating a second signal in response to the user pressing a shutter release button to a second step;
    in response to the second signal, taking a photograph only if the user has indicated the user's consent to using the flash.

7. A digital photographing apparatus comprising:
  a flash;
  a means for alerting a user that the flash will be activated when a picture is taken with the digital photographing apparatus; and
  a shutter release mechanism,
  wherein, in response to the shutter release mechanism being manipulated by the user into a first position, the alerting means alerts the user that the flash will be activated and prompts the user to confirm a status of the flash, and
  wherein, in response to the shutter release mechanism being manipulated by the user into a second position, the flash is activated and the digital photographing apparatus takes the picture only in response to the user confirming the status of the flash.

8. The digital photographing apparatus of claim 7, wherein the flash is activated after the alerting means prompts the user, and only when the user confirms that the flash is to be used.

9. The digital photographing apparatus of claim 7, wherein the flash is activated a predetermined period of time after the alerting means prompts the user.

10. The digital photographing apparatus of claim 7, further comprising a display screen, wherein the display screen displays a menu that gives the user an option to choose between a manual flash protection mode, in which a flash photograph is only taken after manual confirmation from the user, and an automatic flash protection mode, in which the flash photograph is only taken a predetermined period of time after the user has been prompted.

11. The digital photographing apparatus of claim 7, wherein the alerting means is a vibrating device 12. The digital photographing apparatus of claim 7, wherein the alerting means is a speaker that emits an audible signal.

13. The digital photographing apparatus of claim 7, wherein the alerting means is a display that shows both the subject of the picture being taken and a visual indicator representing the alert.

14. The digital photographing apparatus of claim 7, wherein the alerting means is one of a plurality of alerting means, and wherein the digital photographing apparatus further comprises a display screen, wherein the display screen displays a menu that gives the user the option to choose which of the plurality of alerting means is to be activated.

15. The digital photographing apparatus of claim 14, wherein the plurality of alerting means comprises a vibrating alert, a visual alert, and an audible alert.

16. The digital photographing apparatus of claim 7, further comprising:
  an optical system that receives light from the subject of the picture; and
  a digital camera processor that receives signals representing the light received by the optical system and generates an image based on the light signals,
  wherein the digital camera processor controls the actions of the alerting means.

* * * * *